United States Patent

[11] 3,634,650

[72] Inventor Hirokazu Nomura
       Tokyo, Japan
[21] Appl. No. 21,391
[22] Filed Mar. 20, 1970
[45] Patented Jan. 11, 1972
[73] Assignee Nippon Kokan Kabushiki Kaisha
       Tokyo, Japan

[54] FILLET WELDING METHOD
     6 Claims, 3 Drawing Figs.
[52] U.S. Cl. .................................... 219/137,
                                           219/73, 219/74
[51] Int. Cl. ................................... B23k 9/18
[50] Field of Search ........................... 219/137,
                                            130, 73, 74

[56]         References Cited
          UNITED STATES PATENTS
2,620,423  12/1952  Komers et al. ............ 219/137
3,171,944  3/1965   Linnander .................. 219/137
3,182,179  5/1965   Anderson ................... 219/137

Primary Examiner—J. V. Truhe
Assistant Examiner—J. G. Smith
Attorney—Steinberg & Blake ABSTRACT: A method of joining steel plates or the like by depositing a fillet weld at the intersection therebetween. At the intersection between a pair of such plates, one of which is substantially perpendicular to the other, a leading electrode participates in the deposition of a preliminary weld while a trailing electrode follows the leading electrode and participates in the deposition of a final weld which covers the preliminary weld. The preliminary weld serves to burn away paint or other undesirable coatings on the steel plate or the like while the welding current supplied to the trailing electrode is greater than the welding current supplied to the leading electrode by an amount sufficient to melt the preliminary weld and thus permit all organic matters which might form entrapped gas bodies or the like to become dissolved and to escape so that a perfect weld free of blowholes, piping, or other defects is achieved. The magnitude of the current supplied to the trailing electrode is on the order of twice the magnitude of the current supplied to the leading electrode.

INVENTOR
HIROKAZU NOMURA
BY
Steinberg and Blake
ATTORNEYS the present invention it is possible to weld to each other a baseplate and a

FILLET WELDING METHOD

BACKGROUND OF THE INVENTION

The present invention relates to welding.

In particular, the present invention relates to welding of plates which may be made of steel, for example, and which are mutually perpendicular. For example, with the method of the invention it is possible to weld to each other a baseplate and a reinforcing plate which is perpendicular to the baseplate and has an edge engaging a surface of the baseplate. This edge of the reinforcing plate will form with the baseplate a pair of elongated corners at the intersection between the two plates, and fillet welds are deposited in these corners so as to form a T-weld joint between the two plates.

In carrying out conventional horizontal fillet welding with automatic methods such as submerged arc welding, carbon dioxide arc welding, and open arc welding, it frequently happens that defects such as blowholes or pipings are encountered in the welds. Such defects arise from the fact that the plates which are welded will have coatings which include substances which will form gas pockets or the like in the weld. Thus, the plates which are welded may be covered with a wash primer coating, with a zinc-rich epoxy primer or even with a nonzinc epoxy primer, and such coatings, as well as coatings of paint if they happen to be present, for example, detract from the quality of the weld because of the above factors. The organic matters contained in the paint become burned and converted into gaseous bodies which become trapped in the weld metal by the welding arc so as to remain in the metal causing defects of the above type. It is possible to carry out the welding at an extremely slow rate so that the gas which is formed by combustion or decomposition of materials as referred to above will disperse from the welded metal without remaining therein because the solidification of the weld metal takes place at an extremely slow rate. In other words, it is possible to provide welding where the metal reaches an equilibrium as determined by the chemical composition and the like of the welded metal and the welding conditions, and under such operating conditions it is indeed possible to eliminate blowholes or pipings from the weld. This may be seen from the following data in connection with the following experiment 1.

EXPERIMENT 1

| a. Materials used | |
|---|---|
| Submerged arc automatic welding | Flux G 60 |
| | Welding wire US–36, |
| | 3.2 mm. φ |
| | 4.2 mm. φ |
| Carbon dioxide arc welding | Welding wire DWS–51 |
| Open arc welding | Welding wire HS–50A |
| b. Welding conditions | |
| Submerged arc automatic welding | 640 A, 32 V |
| Carbon dioxide arc welding | 390 A, 35–39 V |
| Open arc welding | 400 A, 30–32 V |

0010 NO CARD FOR THIS ILLUSTRATION.

As is apparent from the above table, the least number of blowholes are encountered at a welding rate of 40–50 cm./min. and in fact there are no defects at slower speeds. On the other hand, when the deposition speed is greater the blowholes appear to a considerable extent. Therefore, in welding coated metals or in TIG welding, where an extremely long time is required for the deposition of the weld metal, blowholes are hardly generated even when welding painted steel plates. However, blowholes are very frequently generated in carbon dioxide shielded-arc welding or submerged arc welding where the weld metal is deposited in a relatively short time. However, welding methods which require extremely slow deposition of the weld metal have the very serious drawback of an extremely high cost and low output with difficulties in welding small leg lengths. Thus, there still remains the problem of a satisfactory deposition of a high quality weld in methods where the weld is rapidly applied to steel sheets which are coated.

SUMMARY OF THE INVENTION

It is accordingly a primary object of the present invention to provide a solution to the above problem.

In particular, it is an object of the invention to provide a welding method which makes it possible to rapidly deposit fillet welds at the intersection between mutually perpendicular plates in such a way that defects such as blowholes and pipings are completely eliminated even though the weld metal is rapidly deposited and even though the plates which are welded have coatings of the above type thereon.

Thus, it is an object of the invention to provide a method which makes it possible to greatly increase the output without in any way detracting from the quality of the weld.

It is in particular an object of the invention to provide a method which makes it possible to weld mutually perpendicular plates such as a baseplate and a reinforcing plate in such way as to form a T-weld joint therebetween.

According to the method of the invention, leading and trailing electrodes are moved one after the other along the intersection between mutually perpendicular plates which are to be welded to each other. The leading electrode will deposit a preliminary weld while the trailing electrode will deposit a final weld. With the method of the invention the welding current which is supplied to the trailing electrode is greater than the welding current supplied to the leading electrode by an amount which is sufficient to bring about a weld which is free of any of the defects of the above type. In accordance with the method of the invention the magnitude of the welding current supplied to the trailing electrode is on the order of twice the welding current which is supplied to the leading electrode.

BRIEF DESCRIPTION OF DRAWINGS

The invention is illustrated by way of example in the accompanying drawings which form part of this application and in which.

DESCRIPTION OF PREFERRED EMBODIMENTS

In conventional welding methods, when using a single electrode it is difficult to prevent formation of blowholes because it is not possible to select the proper welding conditions. Furthermore, it is not efficient to burn a weld with an oxyacetylene flame prior to welding with an electrode.

Figure 1:
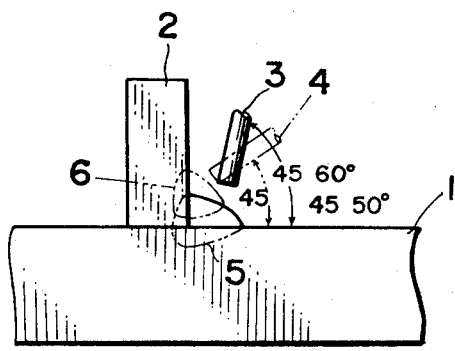
FIG. 1 is a schematic representation of a conventional method for depositing a fillet weld at the intersection between a pair of mutually perpendicular plates.

FIG. 1 schematically represents the welding of a fillet on one side of the intersection between a pair of perpendicular plates, the method which is illustrated in FIG. 1 being that which is most widely used at the present time. FIG. 1 schematically represents a leading electrode 3 and a trailing electrode 4 which are arranged in tandem at a given space from each other so that during the welding operation the leading electrode 3 will first cause deposition of an initial weld while a final weld will be deposited by the trailing electrode 4. In FIG. 1 there is shown the baseplate 1 made of steel or the like and a reinforcing plate 2 situated on the baseplate 1 and being perpendicular thereto, so that the lower edge of the reinforcing plate 2 forms with the upper surface of the baseplate 1, a pair of intersections or corners, one of which receives the weld as illustrated in FIG. 1. It is then, of course, possible to provide the fillet weld at the other intersection so as to provide a T- weld joint between the plates 1 and 2. The welding method illustrated in FIG. 1 is thus the conventional tandem two-electrode type of submerged arc welding which is well known. The leading electrode 3 will normally be positioned at an angle of 45°–60 with respect to the baseplate 1 so as to weld a fillet by supplying suitable welding current to the electrode 3. This particular welding current which is conventionally supplied to the leading electrode 3 is larger than the welding current which is supplied to the trailing electrode 4, so that the leading electrode 3 will fuse the plates as well as the filler rod or wire to form the bead 5 which is indicated in FIG. 1. The trailing electrode 4 will normally be positioned at an angle of 45°–50° with respect to the baseplate 1, and the welding current supplied to the electrode 4 is about 80 percent of the welding current supplied to the leading electrode 3. In this way, the trailing electrode 4 will result in the formation of a bead 6 as schematically represented in FIG. 1. The welding current supplied to the leading electrode 3 will dissolve the paint coatings or the like on the steel sheets 1 and 2, while burning these coatings during formation of the bead 5. The welding current which is reduced to approximately 80 percent of the leading electrode 3 when supplied to the trailing electrode 4 will form the bead 6.

However, with this welding method, the welding current supplied to the leading electrode 3 serves only to weld the plates to each other while the coatings on the plates is not completely burned away. The reduced welding current supplied to the trailing electrode 4 results only in finish welding, so that with this conventional method such defects as blowholes or pipings are commonly encountered. It is known to attempt to eliminate such defects by removing such coatings in advance. For example, mechanical methods such as the use of grinders or wire wheels are conventionally used to eliminate such coatings prior to the welding operations. However, these methods of removal require a long period of time as well as a large amount of labor, so that the costs are undesirably increased. It has also been contemplated to provide a coating of a suitable thin film, but this procedure complicates the method undesirably and reduces the antirust properties of the metal.

According to the method of the present invention it is possible to deposit the fillet welds at both sides of the plate which engages the baseplate to form a T-weld with achievement of an equilibrium as determined by the chemical compositions and the temperature and with a state of relatively easy solidification of the weld metal. These results are achieved in accordance with the method of the invention by providing for the leading electrode a welding current which is relatively small and for the trailing electrode a welding current which is relatively large, so that with the leading electrode burning of the surface coatings of primers or the like will be assured while a complete dispersal of gaseous products is reliably attained with the method after the welding with the trailing electrode so that with the method of the invention there is a complete and reliable dispersal of blowholes and pipings, resulting in perfect welds.

Figure 2A:
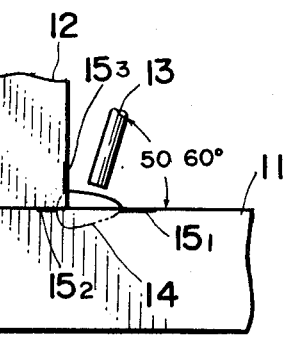
FIG. 2a illustrates the first phase of the method of the invention according to which a fillet weld is deposited with a leading electrode.
Figure 2B:
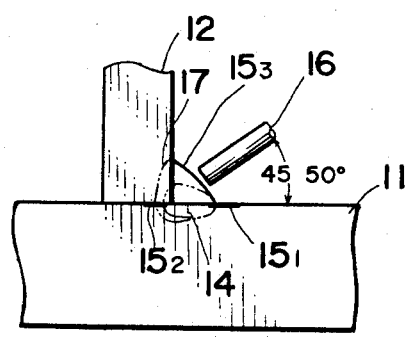
FIG. 2b shows the final stage of the method of the invention according to which a trailing electrode deposits the final weld.

Referring to FIGS. 2a and 2b which illustrate the present invention, it will be seen that a baseplate 11 of steel or the like is shown engaged at its upper surface by the lower edge of a reinforcing plate 12 also made of steel or the like, the plate 12 being perpendicular to the plate 11. In FIGS. 2a and 2b the deposition of the fillet welds according to the invention is shown, taking place on the right side of the plate 12, but it is to be understood that the same operations will take place at the left side to provide a T-weld joint between the plates. Referring to FIG. 2a, the leading electrode 13 is illustrated therein situated at an angle of 50°–60° with respect to the baseplate 11. Welding current is supplied to the leading electrode 13 so as to form the bead 14. FIG. 2a schematically illustrates the areas $15_1$, $15_2$, and $15_3$ on the sheets 11 and 12 where paint or other undesired coatings is burned by the welding current supplied to the leading electrode 13.

Referring to FIG. 2b, the trailing electrode 16 is shown situated at an angle of 45°–50° with respect to the baseplate 11. However, instead of supplying to the trailing electrode 16 a welding current of about 80 percent of the welding current supplied to the leading electrode, this trailing electrode 16 has supplied thereto a welding current which is much greater than that of the leading electrode, as described below, so that in this way with the trailing electrode it is possible to form a bead 17 which it will be noted completely encloses the preliminary bead 14. In other words, the magnitude of the welding current supplied to the trailing electrode 16 is sufficiently great to render the preliminarily bead 14 molten so as to bring about release of any entrapped gaseous products or the like in a highly reliable manner.

Thus, it will be seen that the coated areas $15_1$, $15_2$ and $15_3$ around the preliminary bead 14 are burned by the heat of the electric arc and the heat induced from the extremely hot weld metal so as to gasify the organic matters which are contained in the paints. Then when the greater welding current is supplied to the trailing electrode, the preliminary bead 14 and the areas $15_1$, $15_2$, and $15_3$ are completely covered by the final weld, without scarcely any influence of the welding current on the painted areas $15_1$, $15_2$ and $15_3$ of the steel sheets 11 and 12, so as to prevent the formation of blowholes.

In order to demonstrate the invention, reference may be had to the following experiment 2 which is illustrative of the above-described features of the invention.

EXPERIMENT 2

| | |
|---|---|
| a. Welding wire | Leading wire US–43 |
| | Trailing wire US–36, 4.8 mm. $\phi$ |
| b. Condition of welding | Trailing welding current |
| | 520 A, 34–35 V |
| | (definite value) |
| c. Steel plate | Zinc paint 8,000 |
| | Thickness of coating 20–25 $\mu$ |

TABLE 2

| Deposition speed | | 60 cm./min. | |
|---|---|---|---|
| Diameter of wire | 2.0 mm. | 2.4 mm. | 3.2 mm. |
| Leading welding current | | | |
| 200 A | D D | D D | D D |
| 250 A | 0 0 | 0 0 | D D |
| 300 A | 0 0 | 0 0 | 0 0 |
| 350 A | X X | X X | 0 0 |
| 400 A | X X | X X | X X |
| 450 A | X X | X X | X X |
| 500 A | X X | X X | X X |
| 600 A | X X | X X | X X |

NOTE: D : Electric arc was unstable.

O : No defect was caused in welding.

X : Defects were caused in welding.

As is apparent from the above experiment, the leading current, which is to say the welding current supplied to the leading electrode, was changed by the increments shown in the table while the welding current supplied to the trailing electrode was maintained constant at 520 A. When the leading electrode was provided with a welding current of 200 A., an unstable arc resulted, irrespective of the diameter of the filler wire. When the leading electrode was supplied with a welding current of 250 A., then better welding results were obtained with welding rod or wire of smaller diameter. However, when the welding current supplied to the leading electrode was 300 A., optimum welding results were achieved irrespective of the wire diameter. Then as the welding current supplied to the leading electrode increased to approach and even exceed that supplied to the trailing electrode, blowholes were increasingly encountered at the welds.

It is thus apparent from the above that with the method of the invention as illustrated in FIG. 2, the deposition of the preliminary weld by the leading electrode 13, as illustrated in FIG. 2a, is subject to the influence of the coated areas $15_1$, $15_2$, and $15_3$ and there will indeed be blowhole generation. However, because of the much larger current (approximately twice the preliminary current) supplied to the trailing electrode, the entire preliminary weld is placed in a molten condition becoming integral with and forming a part of the final weld while at the same time bringing about because of the fusion of the entire weld with the trailing electrode, dispersal of any gaseous products so that there is a complete elimination of any blowholes in the final weld.

Of course, the method of the invention can be applied in many different ways in addition to that referred to above.

As described above, it is possible to carry out the welding with the leading and trailing electrodes in a single pass where the trailing electrode is situated at a given distance from the leading electrode while following the latter, depositing the final weld with the much greater welding current to achieve the refusing of the entire weld body with the trailing electrode so that any gaseous products trapped in the preliminary bead deposited by the leading electrode will be effectively dispersed. As is apparent from the above, it has been found that with the invention the value of the welding current supplied to the leading electrode should be approximately half the welding current supplied to the trailing electrode. The welding current supplied to the leading electrode serves primarily to burn away the paint on the steel plates, while the approximately double welding current supplied to the trailing electrode again renders the weld molten so that organic matters which remained in the preliminary weld further burned or dissolved or gasified so as to readily escape out of the weld metal, thus preventing formation of blowholes, pipings, or other defects in the weld with the method of the invention.

What is claimed is:

1. In a method of forming a fillet weld at the intersection between a pair of plates, one of which is substantially perpendicular to the other, the steps of depositing a preliminary weld along the intersection with a leading electrode and then depositing a final weld along the intersection over the preliminary weld with a trailing electrode, while supplying to the leading electrode a welding current whose magnitude is less than the magnitude of the welding current supplied to the trailing electrode by an amount sufficient to eliminate blowholes, pipings, or other defects in the welding and while advancing both electrodes at the same time side of the plates simultaneously along the intersection.

2. In a method as recited in claim 1 and wherein the welding current supplied to the leading electrode is sufficiently great to burn paints or other undesirable coatings on the plates at their intersection where the fillet weld is to be deposited while the magnitude of the welding current supplied to the trailing electrode is greater than that supplied to the leading electrode by an amount sufficient to fuse and again melt the preliminary weld for burning away and gasifying any trapped organic matters in the preliminary weld and permitting any gas which forms to escape from the weld metal, so that after the deposition of the final weld with the trailing electrode at the higher welding current takes place, there are no blowholes, pipings, or other defects in the welding.

3. In a method as recited in claim 2 and wherein the welding current supplied to the trailing electrode is approximately twice the welding current supplied to the leading electrode.

4. In a method as recited in claim 3 and wherein the plates which are welded include a baseplate and a reinforcing plate which is perpendicular to the baseplate and has an edge engaging a surface of the baseplate to form the intersection which receives the weld, said leading electrode being situated at an angle of 50°–60° with respect to the baseplate while said trailing electrode is situated at an angle of 45°–50° with respect to the baseplate.

5. In a method as recited in claim 4 and wherein the welding operations provided at the intersection between the reinforcing plate and baseplate along one side of the reinforcing plate is also repeated at the opposite side thereof to form a T-weld joint between the plates.

6. In a method as recited in claim 1 and wherein the welding current supplied to the trailing electrode is on the order of twice the welding current supplied to the leading electrode.

* * * * *